(12) United States Patent
Mackay et al.

(10) Patent No.: US 11,735,942 B2
(45) Date of Patent: Aug. 22, 2023

(54) MAINTAINING OPERATION WITHIN A STABLE REGION OF A POWER CURVE OF A POWER CONVERTER

(71) Applicant: Cirrus Logic International Semiconductor Ltd., Edinburgh (GB)

(72) Inventors: Graeme G. Mackay, Austin, TX (US); Ajit Sharma, Austin, TX (US); Jason W. Lawrence, Austin, TX (US); Lingli Zhang, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 242 days.

(21) Appl. No.: 17/130,443

(22) Filed: Dec. 22, 2020

(65) Prior Publication Data

US 2022/0037908 A1    Feb. 3, 2022

Related U.S. Application Data

(60) Provisional application No. 63/058,039, filed on Jul. 29, 2020, provisional application No. 63/058,053, filed on Jul. 29, 2020.

(51) Int. Cl.
*H02J 7/00*      (2006.01)
*H02M 3/04*      (2006.01)
*H01M 10/44*     (2006.01)

(52) U.S. Cl.
CPC ......... *H02J 7/007182* (2020.01); *H02M 3/04* (2013.01); *H01M 10/44* (2013.01)

(58) Field of Classification Search
None
See application file for complete search history.

(56) References Cited

U.S. PATENT DOCUMENTS

| 5,248,524 A | 9/1993 | Soderlund |
| 5,617,016 A | 4/1997 | Borghi et al. |

(Continued)

FOREIGN PATENT DOCUMENTS

| CN | 110784140 A | 2/2020 |
| EP | 1919058 A2 | 5/2008 |

(Continued)

OTHER PUBLICATIONS

International Search Report and Written Opinion of the International Searching Authority, International Application No. PCT/US2021/039373, dated Sep. 22, 2021.

(Continued)

*Primary Examiner* — Arun C Williams
(74) *Attorney, Agent, or Firm* — Jackson Walker L.L.P

(57) ABSTRACT

A power delivery system may include a power converter configured to electrically couple to a power source and further configured to supply electrical energy to one or more loads electrically coupled to an output of the power converter and control circuitry configured to monitor a first voltage derived from the power source, wherein the first voltage is indicative of a total power demanded by the power converter, and control a limit for a current supplied from the power source to the one or more loads based on comparison of the first voltage to a threshold voltage, wherein the threshold voltage is indicative of a point within a range of operation of the power converter at which the power converter delivers a maximum amount of power to the one or more loads.

18 Claims, 15 Drawing Sheets

(56) References Cited

U.S. PATENT DOCUMENTS

| | | | |
|---|---|---|---|
| 5,757,167 | A | 5/1998 | Arora et al. |
| 6,177,783 | B1 | 6/2001 | Donohue |
| 6,597,158 | B2 | 7/2003 | Umeda |
| 7,102,340 | B1 | 9/2006 | Ferguson |
| 7,190,150 | B2 | 3/2007 | Chen et al. |
| 7,906,939 | B2 | 3/2011 | Kung et al. |
| 9,088,247 | B2 | 7/2015 | Arno et al. |
| 9,577,587 | B2 | 2/2017 | Maru et al. |
| 9,639,102 | B2 | 5/2017 | Dally |
| 9,742,393 | B2 | 8/2017 | Pavao-Moreira et al. |
| 10,263,523 | B1 | 4/2019 | Sonntag et al. |
| 10,476,392 | B1 | 11/2019 | Matsuura et al. |
| 10,673,423 | B2 | 6/2020 | Forghani-Zadeh et al. |
| 10,720,835 | B2 | 7/2020 | King et al. |
| 10,734,885 | B2 | 8/2020 | King et al. |
| 2001/0020802 | A1 | 9/2001 | Kitagawa et al. |
| 2005/0264268 | A1 | 12/2005 | Ueno |
| 2006/0139819 | A1 | 6/2006 | May |
| 2008/0129219 | A1 | 6/2008 | Smith et al. |
| 2008/0278136 | A1 | 11/2008 | Murtojarvi |
| 2009/0266397 | A1 | 10/2009 | Gibson et al. |
| 2010/0019702 | A1 | 1/2010 | Jang et al. |
| 2010/0156175 | A1 | 6/2010 | Wei |
| 2011/0075446 | A1 | 3/2011 | Doutreloigne et al. |
| 2011/0121653 | A1 | 5/2011 | Hartular et al. |
| 2012/0205974 | A1 | 8/2012 | McCaslin et al. |
| 2012/0268094 | A1 | 10/2012 | Scaldaferr et al. |
| 2013/0106188 | A1 | 5/2013 | Ishibashi et al. |
| 2013/0342177 | A1* | 12/2013 | Slattery ............... H02M 3/156 323/234 |
| 2014/0197814 | A1 | 7/2014 | Shi et al. |
| 2016/0064986 | A1 | 3/2016 | Langlinais et al. |
| 2017/0005647 | A1 | 1/2017 | Pan et al. |
| 2017/0072812 | A1 | 3/2017 | Von Novak et al. |
| 2019/0181754 | A1 | 6/2019 | Ash et al. |
| 2019/0245444 | A1 | 8/2019 | Kimura |
| 2020/0086761 | A1* | 3/2020 | Hamada ............... B60L 58/16 |
| 2020/0235712 | A1 | 7/2020 | May et al. |
| 2021/0083578 | A1 | 3/2021 | King et al. |
| 2021/0159798 | A1 | 5/2021 | Mackay et al. |
| 2021/0364560 | A1 | 11/2021 | Holland et al. |
| 2021/0367510 | A1 | 11/2021 | Lawrence et al. |
| 2021/0367513 | A1 | 11/2021 | Mackay et al. |
| 2021/0367514 | A1 | 11/2021 | Lawrence et al. |
| 2021/0367515 | A1 | 11/2021 | Mackay et al. |
| 2021/0367517 | A1 | 11/2021 | Lawrence et al. |

FOREIGN PATENT DOCUMENTS

| | | | |
|---|---|---|---|
| EP | 2775599 | A1 | 9/2014 |
| EP | 3214746 | A1 | 9/2017 |
| EP | 3240171 | A1 | 11/2017 |
| FR | 2851091 | A1 | 8/2004 |
| GB | 2555902 | A | 5/2018 |
| TW | 201228201 | A | 7/2012 |
| WO | 2012135778 | A1 | 10/2012 |
| WO | 2017027393 | A1 | 2/2017 |
| WO | 2019135820 | A1 | 7/2019 |

OTHER PUBLICATIONS

Yu, Yangwei: "Choosing the Boost with Bypass or Pass Through", Jun. 30, 2017, Retrieved from the Internet Sep. 10, 2021.

Texas Instruments: TPS61291 Loe IQ Boost Converter with Bypass Operation, Sep. 30, 2014, Retrieved from the Internet Sep. 10, 2021.

International Search Report and Written Opinion of the International Searching Authority, International Application No. PCT/US2020/039509, dated Oct. 8, 2021.

International Search Report and Written Opinion of the International Searching Authority, International Application No. PCT/US2020/041535, dated Oct. 14, 2021.

Search Report under Section 17, UKIPO, Application No. GB2106142.9, dated Oct. 20, 2021.

Combined Search and Examination Report under Sections 17 and 18(3), UKIPO, Application No. GB2106144.5, dated Oct. 25, 2021.

International Search Report and Written Opinion of the International Searching Authority, International Application No. PCT/US2021/041547, dated Nov. 2, 2021.

International Search Report and Written Opinion of the International Searching Authority, International Application No. PCT/US2021/041918, dated Nov. 10, 2021.

International Search Report and Written Opinion of the International Searching Authority, International Application No. PCT/US2021/041544, dated Nov. 10, 2021.

Stmicroelectronics NV, AN4218—Hardware design guideline power supply and voltage measurement—Application Note, Doc ID 024014 Rev 3, 26 pages, Oct. 2015.

Freescale Semiconductor, Inc., Multimedia Applications Division, i.MX233 Power Management Unit and Battery Charger—Application Note, Document No. AN3883, Rev. 0, 36 pages, Jul. 2009.

Texas Instruments, TPS6128x Low-, Wide-Voltage Battery Front-End DC/DC Converter Single-Cell Li-Ion, Ni-Rich, Si-Anode Applications—Data sheet, SLVSBI1 A, 57 pages, Oct. 2013, Revised Sep. 2014.

Texas Instruments, Designing Robust TPS65217 Systems for VIN Brownout—Application Report, 13 pages, Oct. 2017.

Renesas Electronics Corporation, Preventing Subsystem Brownouts in Mobile Devices—White Paper, 6 pages.

MFJ Enterprises, Inc., MFJ—Super Battery Booster—Model MFJ-4416C—Instruction Manual, Version 0A, 16 pages, 2017.

International Search Report and Written Opinion of the International Searching Authority, International Application No. PCT/US2020/056782, dated Mar. 4, 2021.

Van Vroonhoven, Caspar, A 0-to-60V-Input Vcm Coulomb Counter with Signal-Dependent Supply Current and ±0.5% Gain Inaccuracy from -50° C. to 125° C., 2020 IEEE International Solid-State Circuits Conference, Feb. 19, 2020.

International Search Report and Written Opinion of the International Searching Authority, International Application No. PCT/US2021/029631, dated Jul. 23, 2021.

Qiu et al., "Digital Average Current-Mode Control of PWM DC-DC Converts without Current Sensors", IEEE Transactions on Industrial Electronics, IEEE Service Center, vol. 57, No. 5, May 10, 2010, Piscataway, NJ, USA.

International Search Report and Written Opinion of the International Searching Authority, International Application No. PCT/US2021/029584, dated Jul. 30, 2021.

International Search Report and Written Opinion of the International Searching Authority, International Application No. PCT/US2021/032474, dated Aug. 3, 2021.

Vinnikov et al., "Solar Optiverter—A Novel Hybrid Approach to the PHotovoltaic Module Level Power Electronics", IEEE Transactions on Industrial Electronics, IEEE Service Center, vol. 66, No. 5, May 1, 2019, pp. 3869-3880, Piscataway, NJ, USA.

International Search Report and Written Opinion of the International Searching Authority, International Application No. PCT/US2021/032496, dated Aug. 4, 2021.

International Search Report and Written Opinion of the International Searching Authority, International Application No. PCT/US2021/030932, dated Aug. 20, 2021.

International Search Report and Written Opinion of the International Searching Authority, International Application No. PCT/US2021/039356, dated Oct. 1, 2021.

International Search Report and Written Opinion of the International Searching Authority, International Application No. PCT/US2020/047237, dated Oct. 30, 2020.

Stala, Robert et al., "A Switched-Capacitor DC-DC Converter with Variable Number of Voltage Gains and Fault-Tolerant Operation", IEEE Transactions on Industrial Electronics, IEEE Service Center, Piscataway, NJ, US, vol. 66, No. 5, May 1, 2019.

* cited by examiner

US 11,735,942 B2

MAINTAINING OPERATION WITHIN A STABLE REGION OF A POWER CURVE OF A POWER CONVERTER

RELATED APPLICATION

The present disclosure claims priority to U.S. Provisional Patent Application Ser. No. 63/058,053, filed Jul. 29, 2020, and U.S. Provisional Patent Application Ser. No. 63/058,039, filed Jul. 29, 2020, both of which are incorporated by reference herein in their entireties.

FIELD OF DISCLOSURE

The present disclosure relates in general to circuits for electronic devices, including without limitation personal portable devices such as wireless telephones and media players, and more specifically, to limiting current in a power converter.

BACKGROUND

Portable electronic devices, including wireless telephones, such as mobile/cellular telephones, tablets, cordless telephones, mp3 players, and other consumer devices, are in widespread use. Such a portable electronic device may include circuitry for implementing a power converter for converting a battery voltage (e.g., provided by a lithium-ion battery) into a supply voltage delivered to one or more components of the portable electronic device. The power delivery network may also regulate such supply voltage, and isolate the downstream loads of these one or more devices from fluctuation in an output voltage of the battery over the course of operation.

In addition to regulating the supply rail for the supply voltage, it may be desirable for the power converter (or a control circuit for the power converter) to provide for active protection mechanisms to limit an amount of current that can be drawn by the one or more components powered from the supply rail.

SUMMARY

In accordance with the teachings of the present disclosure, one or more disadvantages and problems associated with existing approaches to operating a power converter may be reduced or eliminated.

In accordance with embodiments of the present disclosure, a power delivery system may include a power converter configured to electrically couple to a power source and further configured to supply electrical energy to one or more loads electrically coupled to an output of the power converter and control circuitry comprising a feedback loop configured to monitor a voltage derived from the power source and control a limit for a current supplied from the power source to the one or more loads based on the voltage derived from the power source.

In accordance with these and other embodiments of the present disclosure, a method may include monitoring a voltage derived from a power source, wherein a power converter is configured to electrically couple to the power source and the power converter is further configured to supply electrical energy to one or more loads electrically coupled to an output of the power converter and using a feedback loop, controlling a limit for a current supplied from the power source to the one or more loads based on the voltage derived from the power source.

In accordance with these and other embodiments of the present disclosure, a power delivery system may include a power converter configured to electrically couple to a power source and further configured to supply electrical energy to one or more loads electrically coupled to an output of the power converter and control circuitry configured to monitor a first voltage derived from the power source, wherein the first voltage is indicative of a total power demanded by the power converter, and control a limit for a current supplied from the power source to the one or more loads based on comparison of the first voltage to a threshold voltage, wherein the threshold voltage is indicative of a point within a range of operation of the power converter at which the power converter delivers a maximum amount of power to the one or more loads.

In accordance with these and other embodiments of the present disclosure, a method may include monitoring a voltage derived from a power source, wherein the first voltage is indicative of a total power demanded by a power converter configured to electrically couple to the power source and is further configured to supply electrical energy to one or more loads electrically coupled to an output of the power converter and controlling a limit for a current supplied from the power source to the one or more loads based on comparison of the first voltage to a threshold voltage, wherein the threshold voltage is indicative of a point within a range of operation of the power converter at which the power converter delivers a maximum amount of power to the one or more loads.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
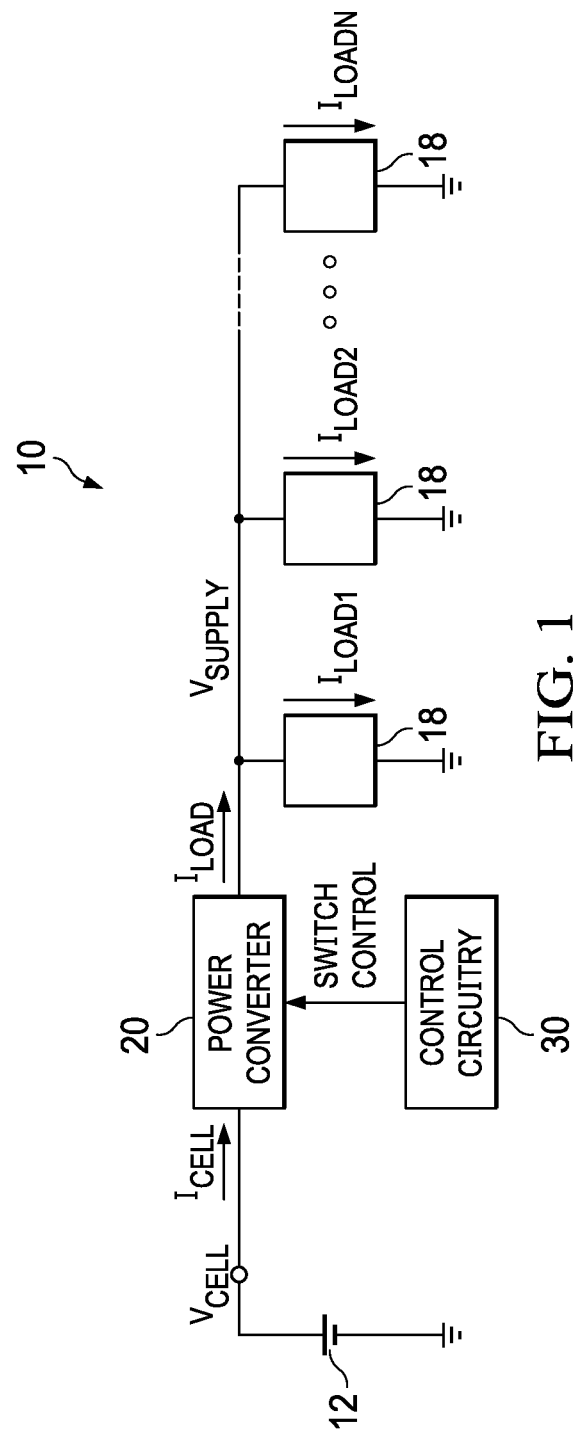
FIG. 1 illustrates a block diagram of selected components of a power delivery network, in accordance with embodiments of the present disclosure.

FIG. 1 illustrates a block diagram of selected components of a power delivery network 10, in accordance with embodiments of the present disclosure. In some embodiments, power delivery network 10 may be implemented within a portable electronic device, such as a smart phone, tablet, game controller, and/or other suitable device.

As shown in FIG. 1, power delivery network 10 may include a battery 12 and a power converter 20 configured to convert a battery voltage $V_{CELL}$ generated by battery 12 into a supply voltage $V_{SUPPLY}$ used to power a plurality of downstream components 18, wherein each downstream component 18 may draw a respective current $I_{LOAD1}$, $I_{LOAD2}$, $I_{LOAD3}$, etc., from the output of power converter 20, meaning an aggregate load current $I_{LOAD}=I_{LOAD1}+I_{LOAD2}+\ldots I_{LOADN}$ may be generated by power converter 20. Power converter 20 may be implemented using a boost converter, buck converter, buck-boost converter, transformer, charge pump, and/or any other suitable power converter. Downstream components 18 of power delivery network 10 may include any suitable functional circuits or devices of power delivery network 10, including without limitation other power converters, processors, audio coder/decoders, amplifiers, display devices, etc.

As shown in FIG. 1, power delivery network 10 may also include control circuitry 30 for controlling operation of power converter 20, including switching and commutation of switches internal to power converter 20. In addition, as described in greater detail below, control circuitry 30 may also implement active protection mechanisms for limiting current $I_{CELL}$ drawn from battery 12.

Figure 2:
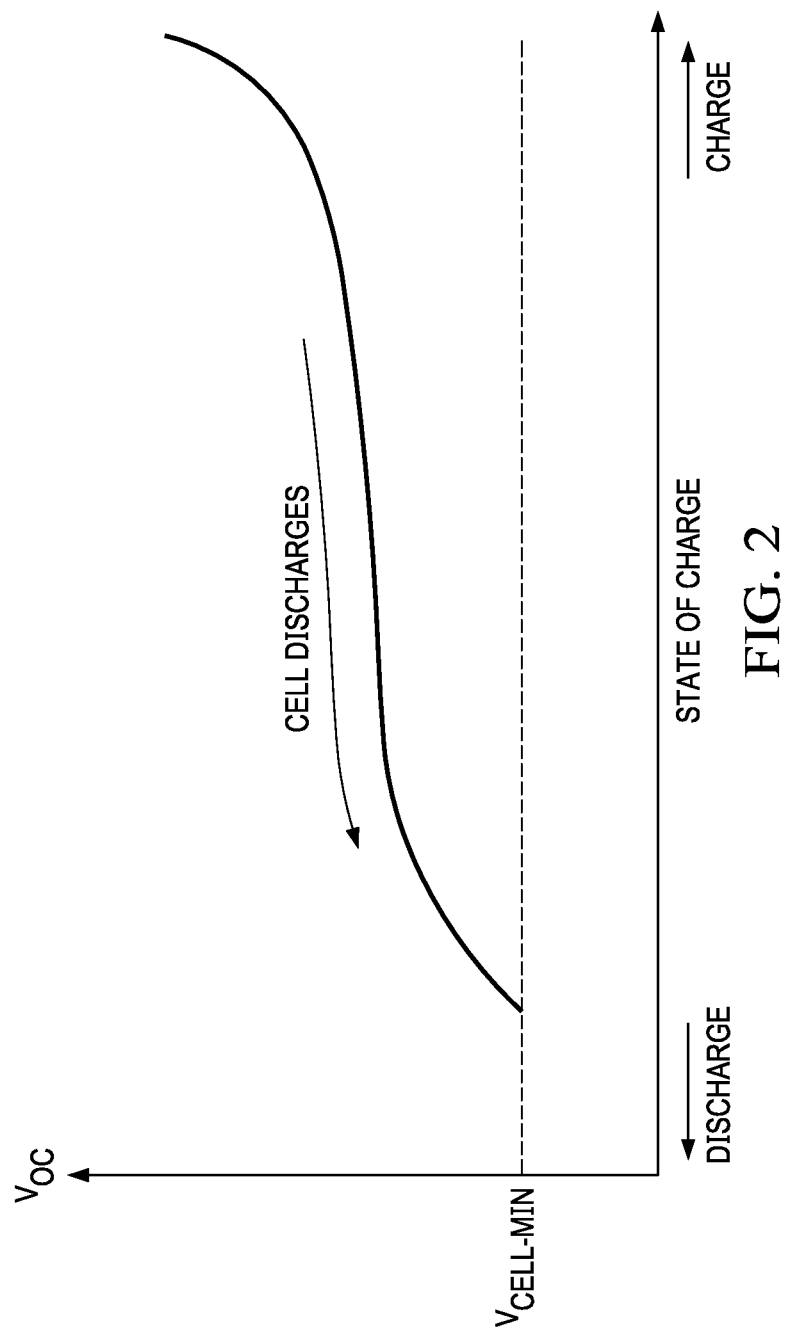
FIG. 2 illustrates an example graph of an open circuit voltage of a battery versus the battery's state of charge, in accordance with embodiments of the present disclosure.

As of the filing date of this application, lithium-ion batteries are typically known to operate from 4.2 V down to 3.0 V, known as an open circuit voltage $V_{OC}$ of the battery (e.g., battery 12). As a battery discharges due to a current drawn from the battery, the state of charge of the battery may also decrease, and open circuit voltage $V_{OC}$ (which may be a function of state of charge) may also decrease as a result of electrochemical reactions taking place within the battery, as shown in FIG. 2. Outside the range of 3.0 V and 4.2 V for open circuit voltage $V_{OC}$, the capacity, life, and safety of a lithium-ion battery may degrade. For example, at approximately 3.0 V, approximately 95% of the energy in a lithium-ion cell may be spent (i.e., state of charge is 5%), and open circuit voltage $V_{OC}$ would be liable to drop rapidly if further discharge were to continue. Below approximately 2.4V, metal plates of a lithium-ion battery may erode, which may cause higher internal impedance for the battery, lower capacity, and potential short circuit. Thus, to protect a battery (e.g., battery 12) from over-discharging, many portable electronic devices may prevent operation below a predetermined end-of-discharge voltage $V_{CELL-MIN}$.

Figure 3:
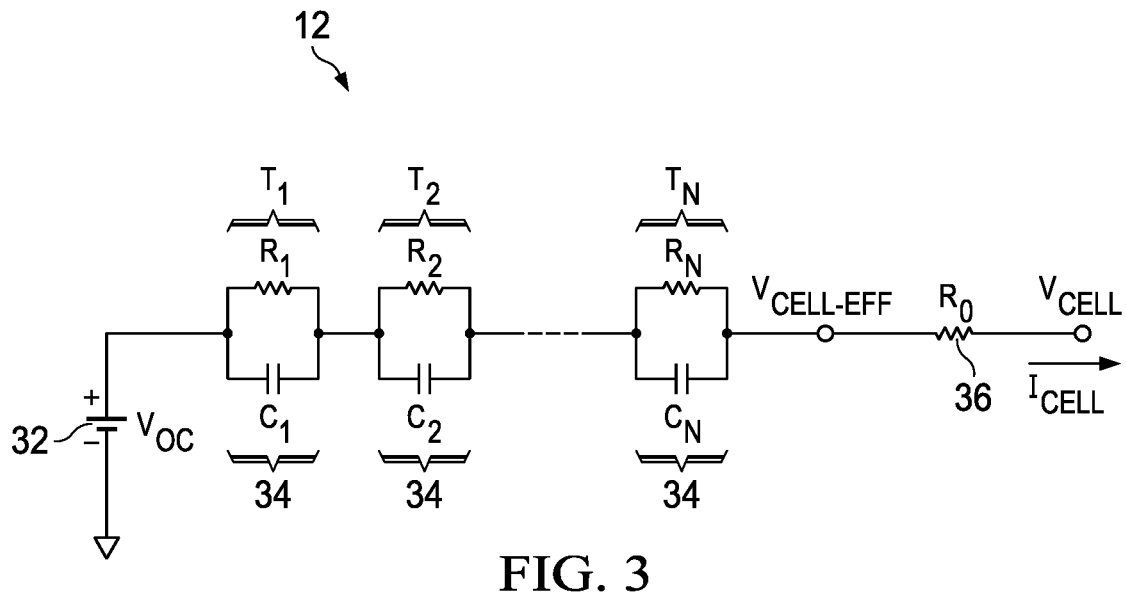
FIG. 3 illustrates a block diagram of selected components of an equivalent circuit model for a battery, in accordance with embodiments of the present disclosure.

FIG. 3 illustrates a block diagram of selected components of an equivalent circuit model for battery 12, in accordance with embodiments of the present disclosure. As shown in FIG. 3, battery 12 may be modeled as having a battery cell 32 having an open circuit voltage $V_{OC}$ in series with a plurality of parallel resistive-capacitive sections 34 and further in series with an equivalent series resistance 36 of battery 12, such equivalent series resistance 36 having a resistance of $R_0$. Resistances $R_1, R_2, \ldots R_N$, and respective capacitances $C_1, C_2, \ldots, C_N$ may model battery chemistry-dependent time constants $\tau_1, \tau_2, \ldots, \tau_N$, that may be lumped with open circuit voltage $V_{OC}$ and equivalent series resistance 36. Notably, an electrical node depicted with voltage $V_{CELL-EFF}$ in FIG. 3 captures the time varying discharge behavior of battery 12, and battery voltage $V_{CELL}$ is an actual voltage seen at the output terminals of battery 12. Voltage $V_{CELL-EFF}$ may not be directly measurable, and thus battery voltage $V_{CELL}$ may be the only voltage associated with battery 12 that may be measured to evaluate battery state of health. Also of note, at a current draw of zero (e.g., $I_{CELL}=0$), battery voltage $V_{CELL}$ may be equal to voltage $V_{CELL-EFF}$ which may in turn be equal to an open circuit voltage $V_{OC}$ at a given state of charge.

Figure 4:
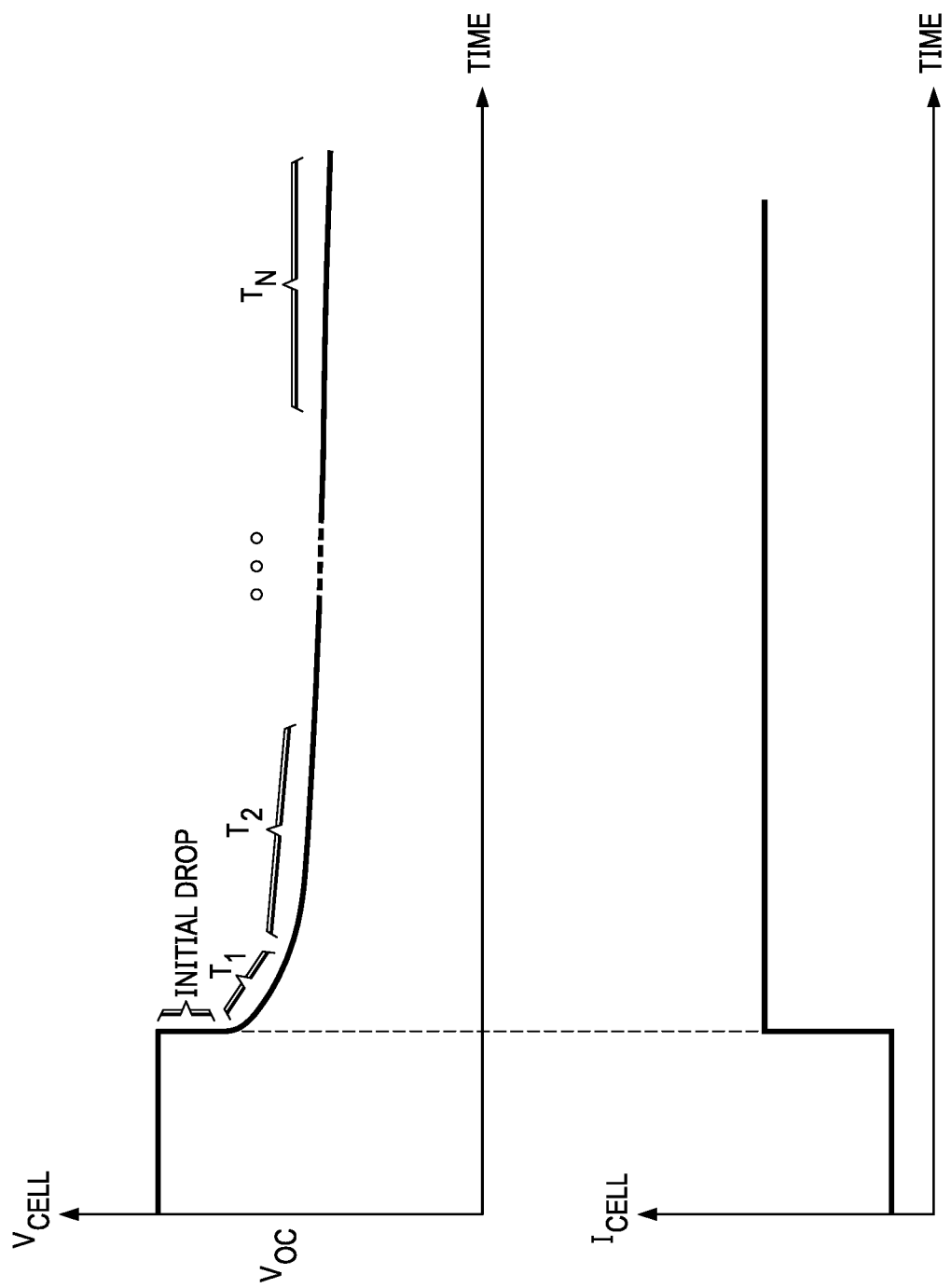
FIG. 4 illustrates example graphs of a battery voltage and a battery current versus time associated with a current step drawn from a battery, in accordance with embodiments of the present disclosure.

FIG. 4 illustrates example graphs of battery voltage $V_{CELL}$ and battery current $I_{CELL}$ current versus time associated with a current step drawn from battery 12, in accordance with embodiments of the present disclosure. As shown in FIG. 4, in response to a current step event, battery voltage $V_{CELL}$ may respond to the step, as the response curve for battery voltage $V_{CELL}$ experiences an initial instantaneous drop (e.g., due to equivalent series resistance 36) and time-dependent voltage drops due to time constants $\tau_1$, $\tau_2$, ..., $\tau_N$. Open circuit voltage $V_{OC}$ and the various impedances $R_0$, $R_1$, $R_2$, ... $R_N$, may be a function of state of charge of battery 12, thus implying that a transient response to a new, fully-charged battery could be significantly different from that of an aged, partially-discharged battery.

In operation, control circuitry 30 may determine a maximum battery current $I_{CELL}$ that may be drawn from battery 12 at any given instant based on one or more constraints, including protection of battery 12, stability of power converter 20, and/or limitations associated with practical limitations.

Figure 5:
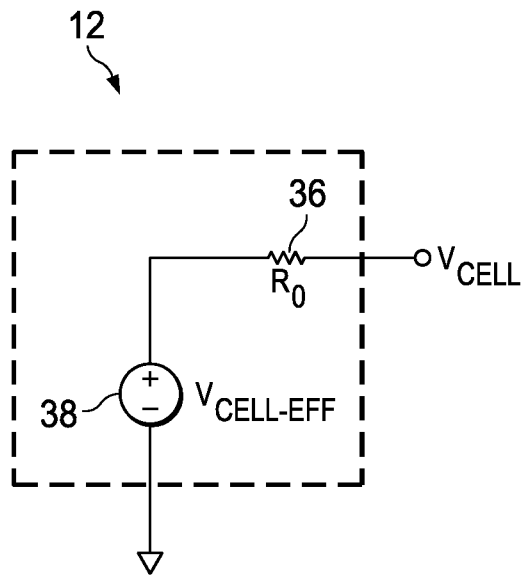
FIG. 5 illustrates a first-order model of a battery simplified to a time-varying voltage source in series with an equivalent series resistance, in accordance with embodiments of the present disclosure.

A first constraint that may be imposed by control circuitry 30 are battery-imposed limitations for the maximum of battery current $I_{CELL}$. To illustrate application of this constraint, FIG. 5 illustrates a first-order model of battery 12 simplified to a time-varying voltage source 38 with voltage $V_{CELL-EFF}$ in series with equivalent series resistance 36 having a resistance value of $R_0$, in accordance with embodiments of the present disclosure. A maximum battery current $I_{CELL-MAX}$ that battery 12 may be capable of delivering may be directly dependent on equivalent series resistance 36. Battery current $I_{CELL}$ must pass through equivalent series resistance 36, which may reduce battery voltage $V_{CELL}$ from voltage $V_{CELL-EFF}$ by an amount equal to resistance $R_0$ multiplied by battery current $I_{CELL}$ (e.g., $V_{CELL}=V_{CELL-EFF}-R_0 I_{CELL}$). Perhaps more significantly, battery current $I_{CELL}$ flowing through equivalent series resistance 36 may cause power dissipation within battery 12 that is equal to resistance $R_0$ multiplied by the square of battery current $I_{CELL}$ (e.g., $P=R_0 I_{CELL}^2$). At high rates of discharge, battery current $I_{CELL}$ may lead to significant heating within battery 12. The requirement discussed above that battery voltage $V_{CELL}$ must remain above end-of-discharge voltage $V_{CELL-MIN}$ sets a limitation on maximum battery current $I_{CELL-MAX}$, as given by:

$$I_{CELL-MAX} = \frac{V_{CELL-EFF} - V_{CELL-MIN}}{R_0}$$

Figure 6:
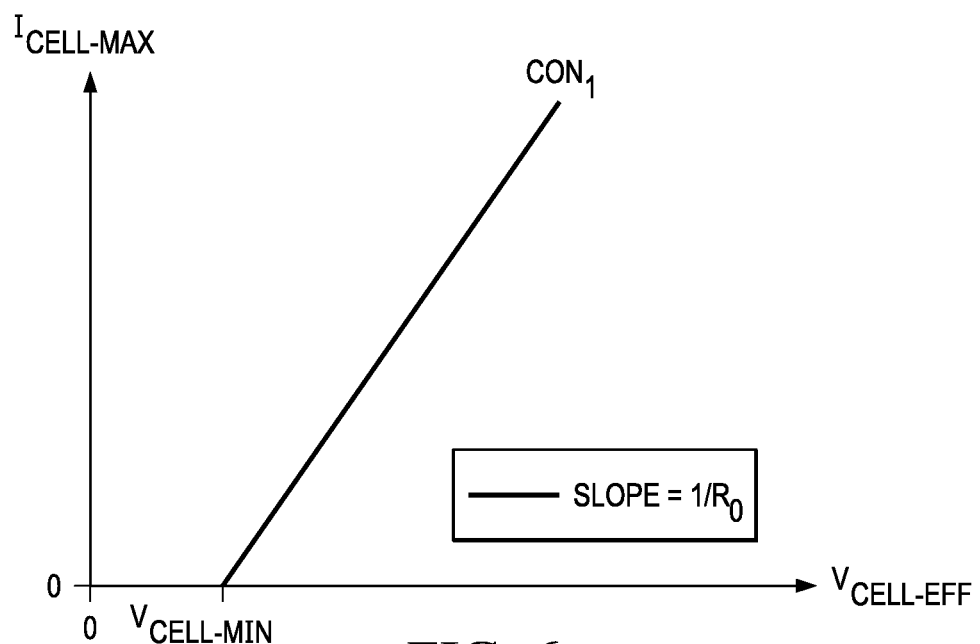
FIG. 6 illustrates an example graph of a maximum battery current versus an internal effective battery voltage for battery protection, in accordance with embodiments of the present disclosure.

Accordingly, maximum battery current $I_{CELL-MAX}$ may be a function of voltage $V_{CELL-EFF}$, assuming only battery-imposed limitations, and may be plotted as illustrated by line CON1 shown in FIG. 6.

To enforce such limitation, control circuitry 30 may implement an active protection scheme to ensure that end-of-discharge voltage $V_{CELL-MIN}$ is not violated, despite transient loads on power converter 20, so as to avoid damage to battery 12. For example, control circuit 30 may be configured to monitor battery voltage $V_{CELL}$ at terminals of battery 12 and vary maximum battery current $I_{CELL-MAX}$ drawn by power converter 20 as shown by constraint CON1 in FIG. 6 in order to ensure battery 12 is not over-discharged to pushed beyond its safe operating range, in order to extend life of battery 12. However, complicating such control of maximum battery current $I_{CELL-MAX}$ is that the transient response of battery 12 may be a function of multiple time constants (e.g., $\tau_1$, $\tau_2$, ..., $\tau_N$) as described above, and it may be unfeasible or uneconomical to measure such time constants for a given battery and vary maximum battery current $I_{CELL-MAX}$ in a feedforward manner Thus, as further described below, control circuitry 30 may implement a negative feedback control loop around power converter 20 that may monitor battery voltage $V_{CELL}$ and vary maximum battery current $I_{CELL-MAX}$ to maintain battery voltage $V_{CELL}$ at a desired target value.

Figure 7:
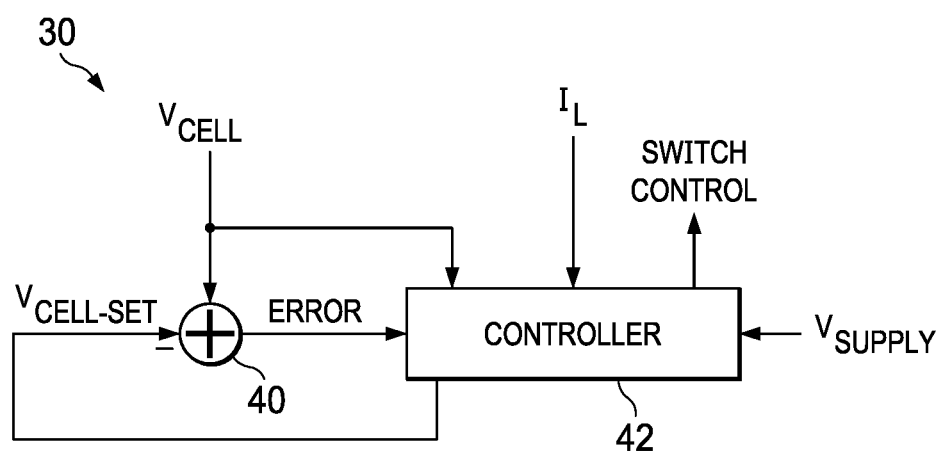
FIG. 7 illustrates a block diagram of selected components of control circuitry for controlling a power converter, in accordance with embodiments of the present disclosure.

FIG. 7 illustrates a block diagram of selected components of control circuitry 30 for controlling power converter 20, in accordance with embodiments of the present disclosure. As shown in FIG. 7, control circuitry 30 may implement a controller 42 for controlling power converter 20. Controller 42 may be implemented as a proportional-integral (PI) controller, proportional-integral-derivative (PID) controller, or any other suitable controller type.

In operation, a combiner 40 may calculate an error signal ERROR as a difference between battery voltage $V_{CELL}$ at a set-point target value $V_{CELL-SET}$ for battery voltage $V_{CELL}$. Based on such error signal ERROR and a feedback signal representing a supply voltage $V_{SUPPLY}$, controller 42 may generate switch control signals for controlling operation of power converter 20, such as generation of pulse-width modulation signals for commutating switches internal to power converter 20, as an example. For example, in some embodiments, controller 42 may receive a signal indicative of an inductor current $I_L$ associated with a current flowing through a power inductor integral to power converter 20, and control switching of switches of power converter 20 based on a target average current for the battery current $I_{CELL}$ drawn by power converter 20 from battery 12, which such target average current may be used to establish a minimum or "valley" for inductor current $I_L$ and a target maximum or "peak" for inductor current $I_L$, as described in U.S. patent application Ser. No. 17/119,517 filed Dec. 11, 2020, and incorporated by reference herein in its entirety.

To satisfy constraint CON1 described above, it may be desirable for aggregate load current $I_{LOAD}$ to respond to transients in battery voltage $V_{CELL}$ and decrease accordingly in order to prevent violation of battery safe operating requirements, even in a transient case. Accordingly, controller 42 may include an active protection mechanism by using a time-dependent throttling of aggregate load current $I_{LOAD}$ based on an instantaneous battery voltage $V_{CELL}$. Stated another way, as battery voltage $V_{CELL}$ decreases, battery current $I_{CELL}$ drawn from battery 12 must be reduced to more aggressively arrest the decrease in battery voltage $V_{CELL}$. Accordingly, as described in greater detail below, controller 42 may implement a negative feedback loop to control battery voltage $V_{CELL}$ and throttle battery current $I_{CELL}$ by increasing set-point target value $V_{CELL-SET}$.

Figure 8:
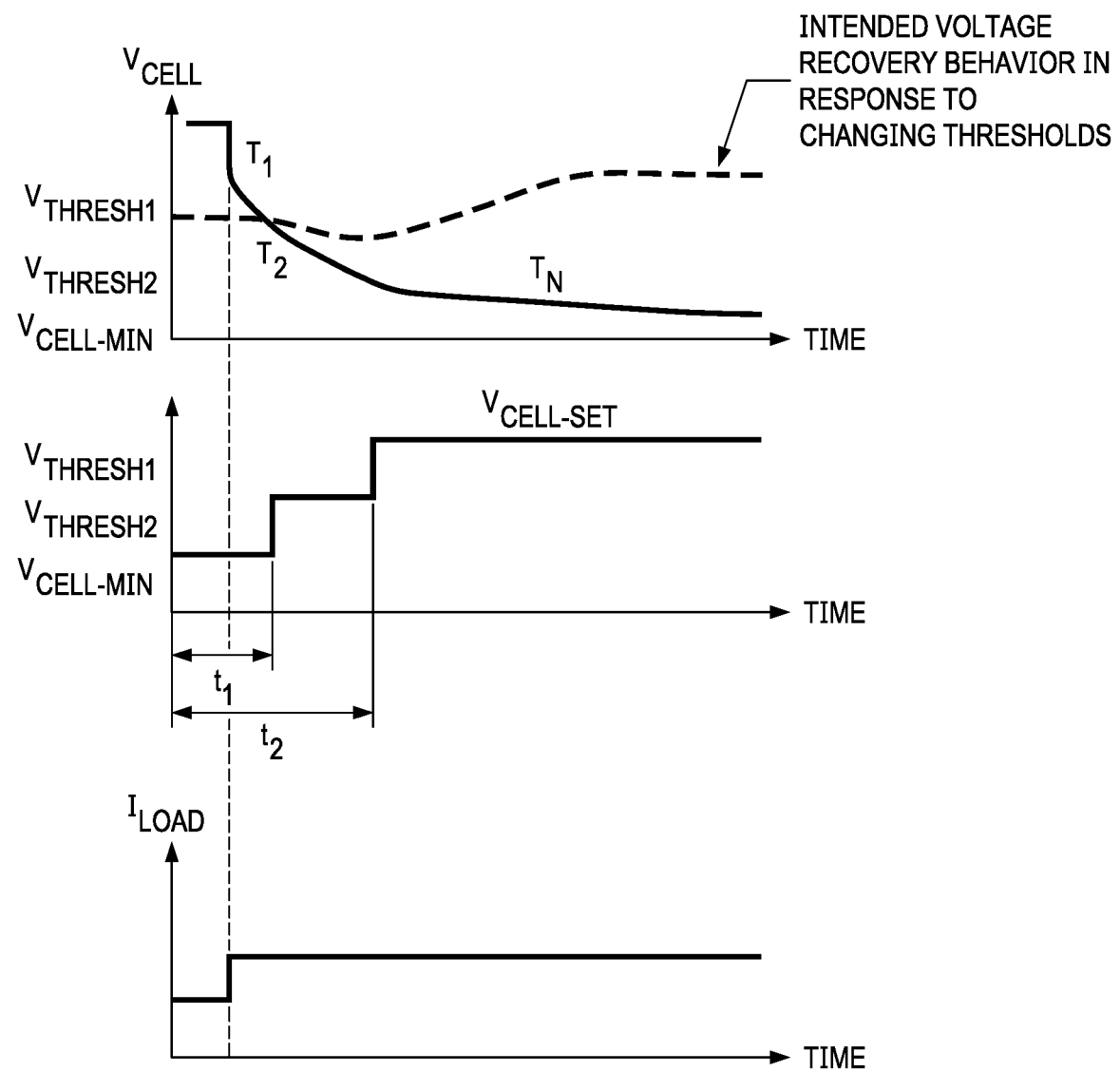
FIG. 8 illustrates an example graph of a battery voltage, a target set-point value for the battery voltage, and a load current versus time associated with a current step on a load of a power converter, in accordance with embodiments of the present disclosure.

For example, as shown in FIG. 8, controller 42 may establish two threshold voltages $V_{THRESH1}$ and $V_{THRESH2}$ that are shown as being crossed by battery voltage $V_{CELL}$ at times $t_1$ and $t_2$, respectively, in response to a step aggregate load current $I_{LOAD}$, with $V_{THRESH1} > V_{THRESH2}$. Further as shown in FIG. 8, when battery voltage $V_{CELL}$ decreases below first threshold voltage $V_{THRESH1}$, controller 42 may increase set-point target value $V_{CELL-SET}$ from end-of-discharge voltage $V_{CELL-MIN}$ to second threshold voltage $V_{THRESH2}$. Also as shown in FIG. 8, when battery voltage $V_{CELL}$ decreases below second threshold voltage $V_{THRESH2}$, controller 42 may increase set-point target value $V_{CELL-SET}$ from end-of-discharge voltage $V_{CELL-MIN}$ to first threshold voltage $V_{THRESH1}$. Accordingly, such increases to set-point target value $V_{CELL-SET}$ may cause a recovery of battery voltage $V_{CELL}$, as shown by the dotted-line plot of battery voltage $V_{CELL}$ in FIG. 8.

Figure 9:
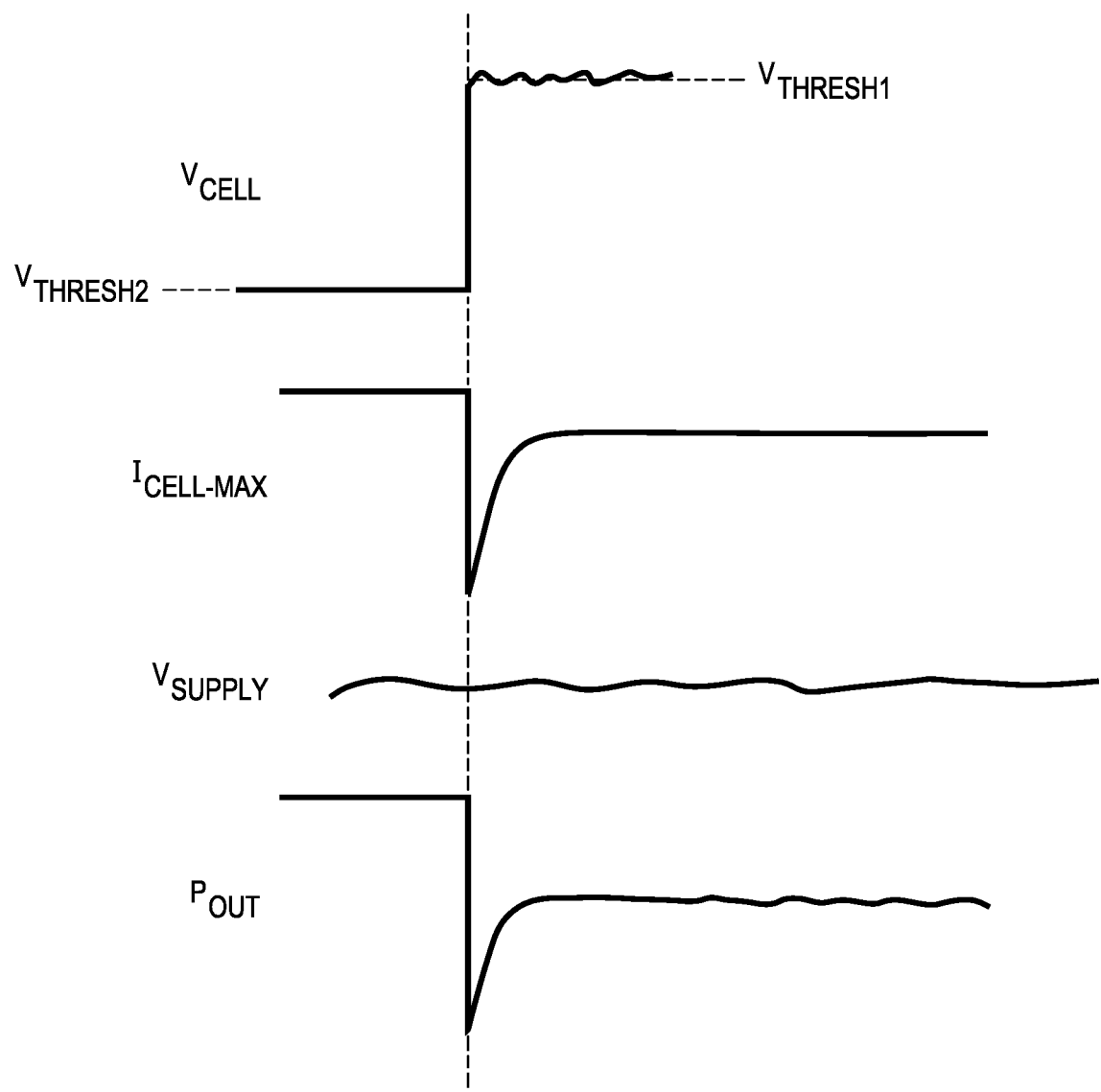
FIG. 9 illustrates an example graph of a battery voltage, a maximum set-point value for battery current drawn by a power converter, a supply voltage generated by the power converter, and an output power of a power converter versus time associated with a step-based switching of a target set-point value for the battery voltage, in accordance with embodiments of the present disclosure.

However, an instantaneous step increase of set-point target value $V_{CELL-SET}$ as suggested in FIG. 8 may cause an undershoot of a maximum battery current $I_{CELL-MAX}$ for battery current $I_{CELL}$ drawn by power converter 20 from battery 12, as shown in FIG. 9. Such undershoot may occur as an internal impedance of battery 12 may resist a sudden change in current delivered from battery 22. While power converter 20 may adequately regulate supply voltage $V_{SUPPLY}$ through such undershoot, the undershoot in target average maximum current $I_{CELL-MAX}$ may lead to an undesirable drop in output power $P_{OUT}$ delivered to downstream components 18, possibly leading to negative effects on downstream components 18. To reduce or eliminate such undershoot of maximum battery current $I_{CELL-MAX}$ delivered from battery 12, controller 42 may be configured to ramp changes to set-point target value $V_{CELL-SET}$ rather than generate instantaneous changes to set-point target value $V_{CELL-SET}$, as shown in FIG. 10.

Figure 10:
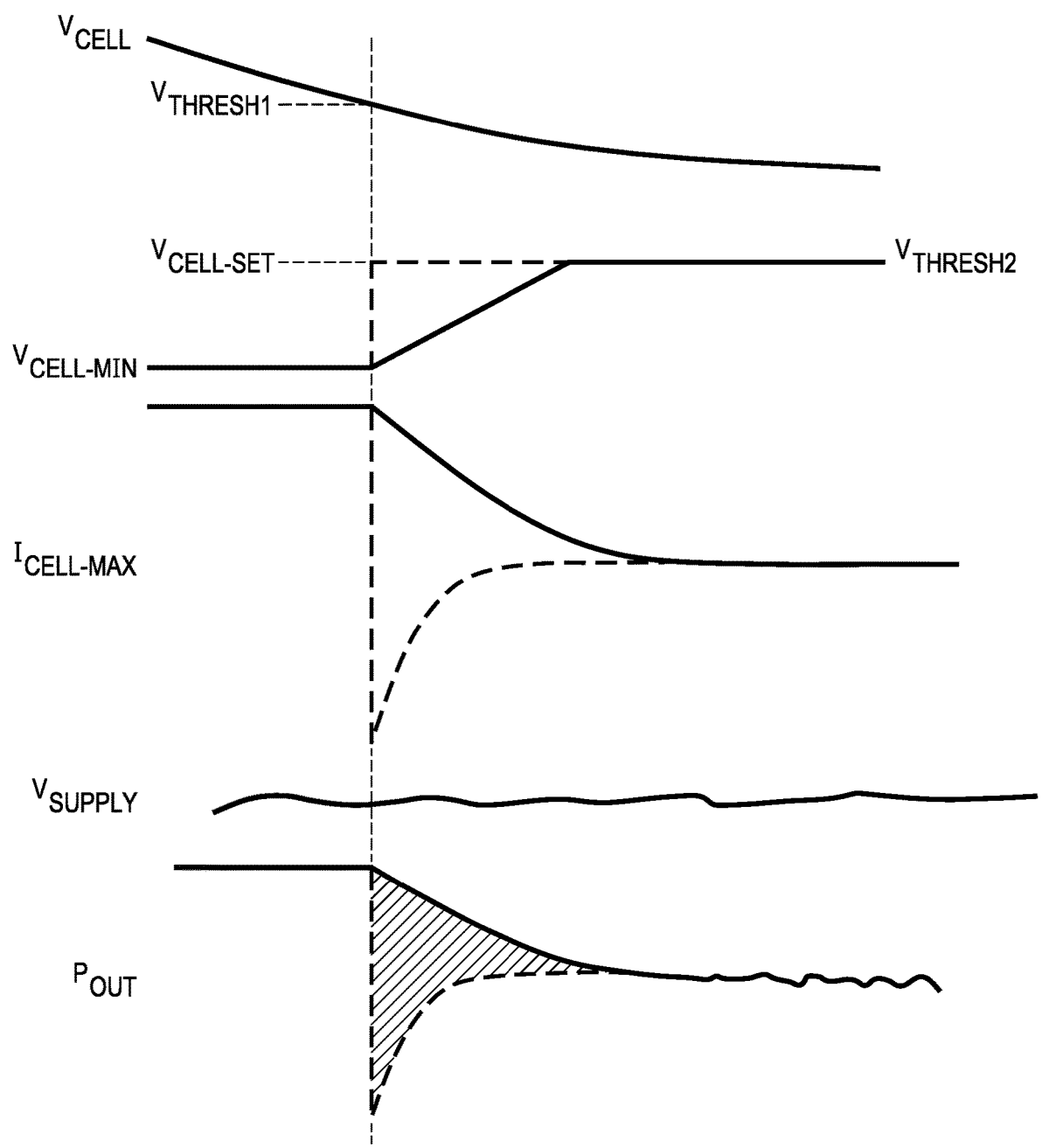
FIG. 10 illustrates an example graph of a battery voltage, a maximum battery current drawn by a power converter, a supply voltage generated by the power converter, and an output power of a power converter versus time associated with a ramped-based switching of a target set-point value for the battery voltage, in accordance with embodiments of the present disclosure.

FIG. 10 illustrates an example graph of battery voltage $V_{CELL}$, maximum battery current $I_{CELL-MAX}$, supply voltage $V_{SUPPLY}$, output power $P_{OUT}$, and set-point target value $V_{CELL-SET}$ ramped between end-of-discharge voltage $V_{CELL-MIN}$ to second threshold voltage $V_{THRESH2}$. Solid-line plots depict the ramped set-point target value $V_{CELL-SET}$ and responses to such ramping while dotted-line plots depict an instantaneously varied set-point target value $V_{CELL-SET}$ and responses to such instantaneous change. Such ramping may reduce or eliminate undershoot in maximum battery current $I_{CELL-MAX}$, and reduce or eliminate the limitation on output power $P_{OUT}$ associated with instantaneous change to set-point target value $V_{CELL-SET}$. For example, the portion of FIG. 10 shaded with diagonal lines may represent additional output power $P_{OUT}$ available from ramping set-point target value $V_{CELL-SET}$ as opposed to instantaneously varying set-point target value $V_{CELL-SET}$.

Figure 11:
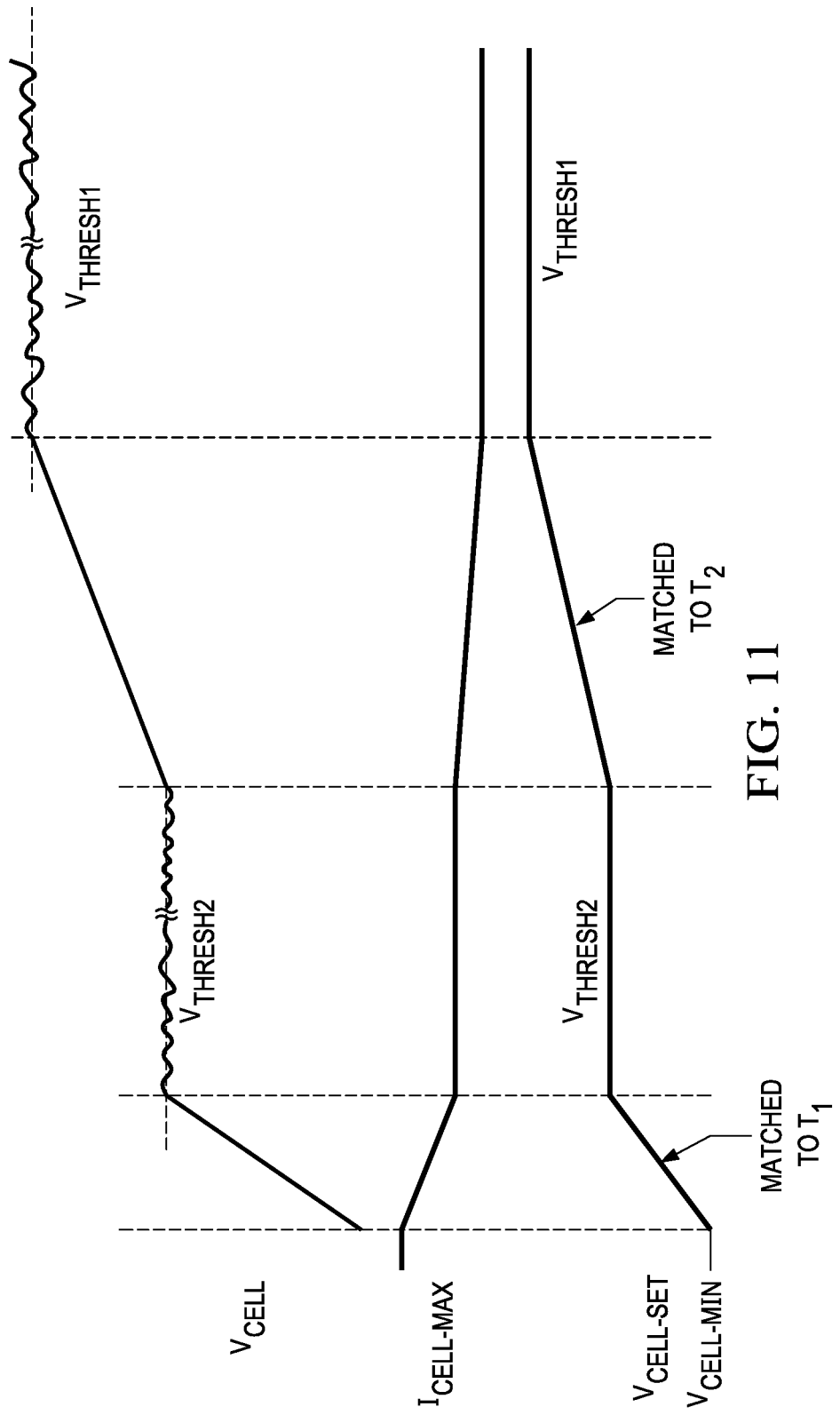
FIG. 11 illustrates an example graph of a battery voltage, a battery current drawn by a power converter, a supply voltage generated by the power converter, and an output power of a power converter versus time associated with a ramped-based switching of a target set-point value for the battery voltage wherein ramping is matched to battery time constants, in accordance with embodiments of the present disclosure.

To further improve the advantages of ramping of set-point target value $V_{CELL-SET}$ as shown in FIG. 10, controller 42 may be configured in some embodiments to ramp changes in set-point target value $V_{CELL-SET}$ to match or approximate the chemistry-dependent time constants $\tau_1, \tau_2, \ldots, \tau_N$ of battery 12 depicted in FIGS. 3 and 4. For example, as shown in FIG. 11, in response to a decrease in battery voltage $V_{CELL}$ below a given threshold, set-point target value $V_{CELL-SET}$ may increase from end-of-discharge voltage $V_{CELL-MIN}$ to second threshold voltage $V_{THRESH2}$ with a ramp rate matched or approximating chemistry-dependent time constant $\tau_1$, after which it may remain at second threshold voltage $V_{THRESH2}$ for a predetermined period of time before increasing to first threshold voltage $V_{THRESH1}$ with a ramp rate matched or approximating chemistry-dependent time constant $\tau_2$. Although FIG. 11 depicts controlled ramping associated with two chemistry-dependent time constants, in some embodiments, controller 42 may cause ramping among more than two threshold voltage levels as shown in FIG. 11, wherein each ramping is matched to or approximates a chemistry-dependent time constant of battery 12. Accordingly, in such embodiments, controller 42 may be programmed with desired threshold voltages for battery voltage $V_{CELL}$, ramp rates for set-point target value $V_{CELL-SET}$, set-point threshold levels $V_{THRESH1}$, $V_{THRESH2}$, etc. for set-point target value $V_{CELL-SET}$, and durations of time for which set-point target value $V_{CELL-SET}$ is set to each of the set-point threshold levels.

Figure 12:
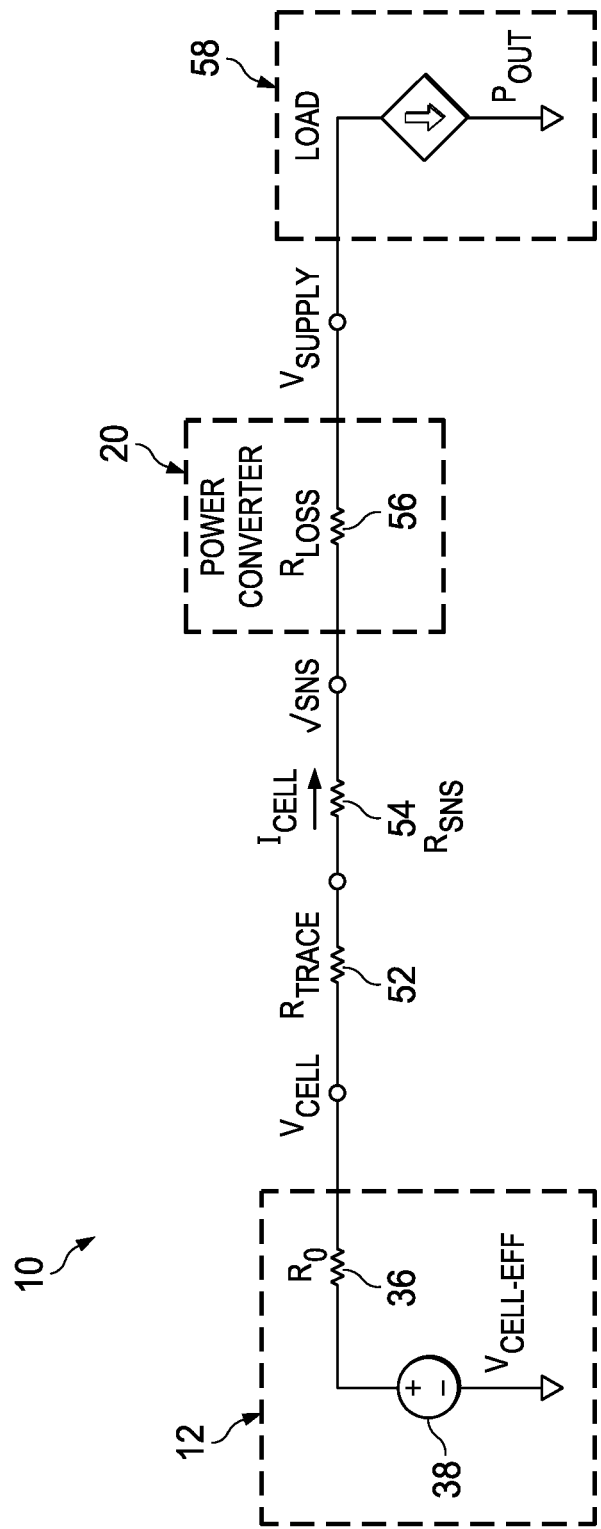
FIG. 12 illustrates a block diagram of selected impedances within the power delivery network shown in FIG. 1, in accordance with embodiments of the present disclosure.

In addition to limiting current to provide for protection of battery 12 as described above, it may also be desirable to limit current to provide stability for power converter 20, in order to operate beyond a maximum power point into a region of instability of power converter 20, as described in greater detail below. To illustrate, reference is made to FIG. 12, which depicts a detailed block diagram of selected impedances within power delivery network 10 shown in FIG. 1, in accordance with embodiments of the present disclosure. As shown in FIG. 12, power delivery network 10 may be modeled with battery 12 as shown in FIG. 5 in series with a trace resistor 52, a current sense resistor 54, an impedance 56 to model equivalent losses in power converter 20, and a load 58 representing the aggregate of downstream devices 18. Trace resistor 52 may have a resistance $R_{TRACE}$ representing a resistance of electrical conduit between battery 12 and power converter 20 (e.g., a connector, printed circuit board trace, etc.). Sense resistor 54 may have a resistance $R_{SNS}$ and may be used to sense battery current $I_{CELL}$ based on a voltage drop across sense resistor 54 and resistance $R_{SNS}$ in accordance with Ohm's law. Impedance 56 may model losses inside power converter 20 with resistance $R_{LOSS}$. After accounting for power losses occurring in these various impedances, power converter 20 may deliver output power $P_{OUT}$ to load 58, given as:

$$P_{OUT} = I_{CELL} V_{CELL-EFF} - I_{CELL}^2 R_{TOT}$$

where $$R_{TOT} = R_0 + R_{TRACE} + R_{SNS} + R_{LOSS}$$

Figure 13:
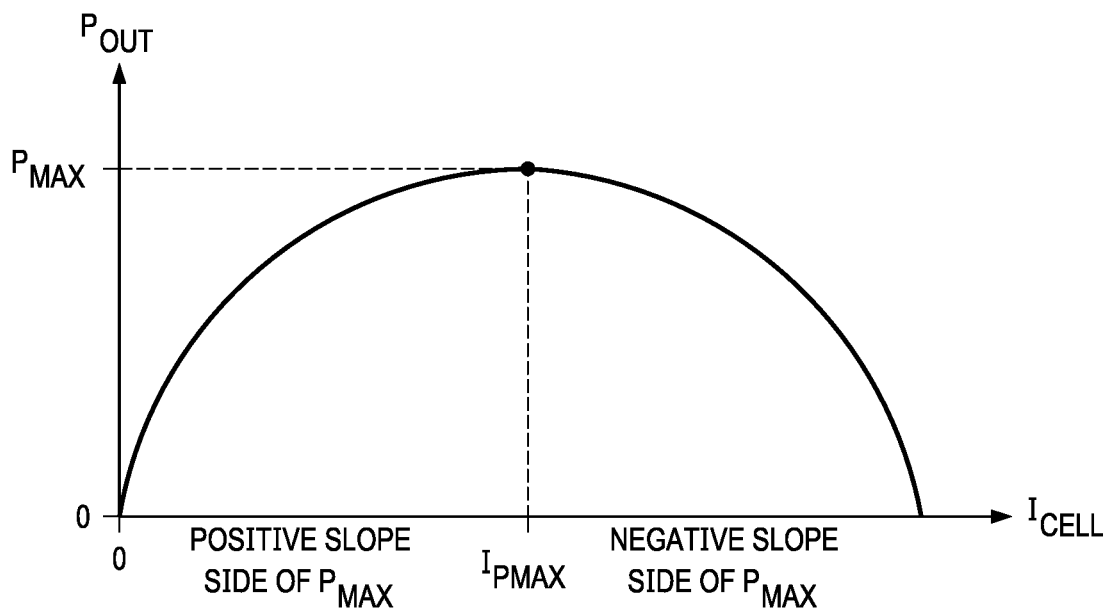
FIG. 13 illustrates an example graph of an output power of a power converter versus battery current drawn by the power converter, in accordance with embodiments of the present disclosure.

For a given total resistance $R_{TOT}$ and given voltage $V_{CELL-EFF}$, there may exist a maximum power $P_{MAX}$ for output power $P_{OUT}$ of power delivery network 10 as a function of battery current $I_{CELL}$ that occurs at a current $I_{PMAX}$, as shown in FIG. 13, where current $I_{PMAX}$ may be given by:

$$I_{PMAX} = \frac{V_{CELL-EFF}}{2R_{TOT}}$$

Figure 14:
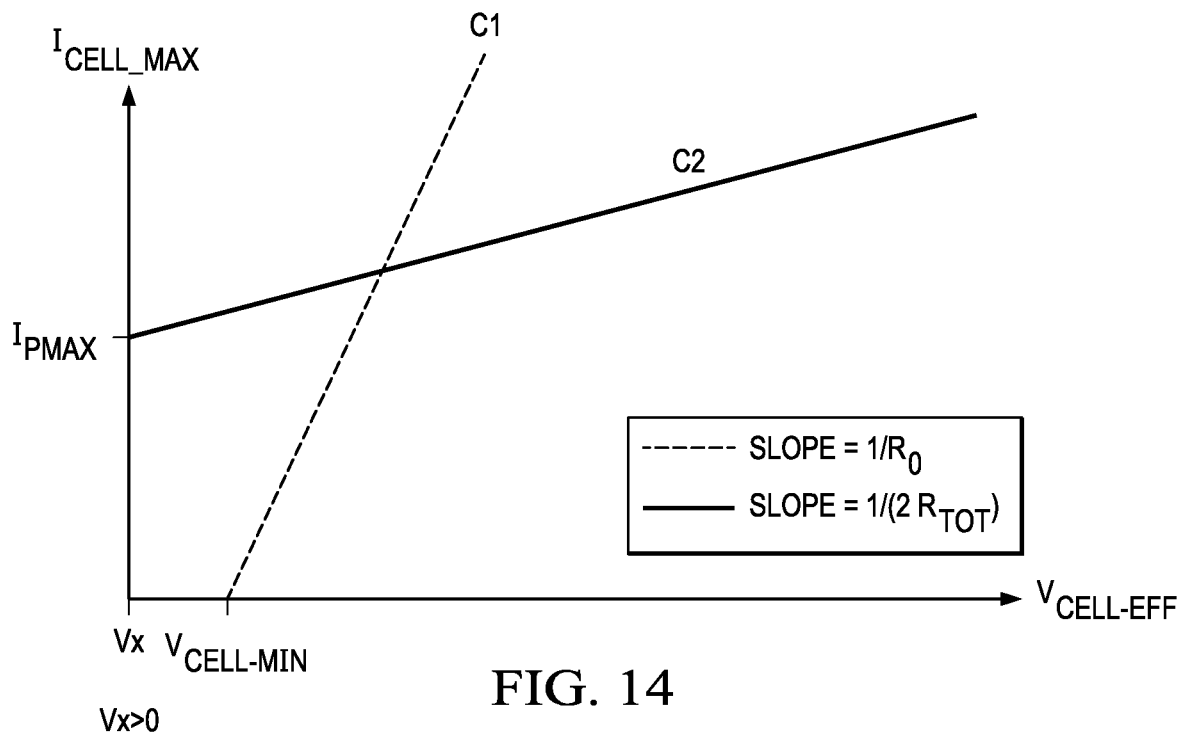
FIG. 14 illustrates an example graph of a maximum battery current versus an internal effective battery voltage for power converter stability, in accordance with embodiments of the present disclosure.

Thus, it is shown from FIG. 13 that power delivery system 10 will operate with optimum power efficiency and stability if $I_{CELL} < I_{PMAX}$, and will operate in a region of instability (negative slope of output power $P_{OUT}$ versus battery current $I_{CELL}$) when $I_{CELL} > I_{PMAX}$. This maximum allowable current $I_{PMAX}$ may be plotted as shown in FIG. 14 as constraint CON2 superimposed over constraint CON1 for maximum battery current $I_{CELL-MAX}$ depicted in FIG. 6. Because total resistance $R_{TOT}$ is greater than equivalent series resistance $R_0$, it may be evident that the slope of constraint CON1 is steeper than the slope of constraint CON2. On extrapolation, the line of constraint CON2 may intercept the horizontal axis of voltage $V_{CELL-EFF}$ at 0 V, which is not shown in FIG. 14, as many batteries (e.g., lithium-ion batteries) will not be allowed to drop to such magnitude.

For high-efficiency power converters, impedance 56 may be negligible compared to equivalent series resistance 36, trace resistor 52, and sense resistor 54, such that total resistance $R_{TOT}$ may be rewritten as:

$$R_{TOT} \approx R_0 + R_{TRACE} + R_{SNS}$$

As battery 12 is discharged with use, equivalent series resistance 36 may increase and voltage $V_{CELL-EFF}$ may decrease accordingly. Therefore, maximum allowable current $I_{PMAX}$ corresponding to maximum power $P_{MAX}$ may be a function of voltage $V_{CELL-EFF}$ and impedances of power delivery network 10.

One approach to ensure constraint CON2 is satisfied may be to track voltage $V_{CELL-EFF}$, impedances of power delivery network 10, and battery current $I_{CELL}$ and ensure that battery current $I_{CELL}$ never exceeds current $I_{PMAX}$. Such an approach may require a high-speed analog-to-digital converter to measure battery current $I_{CELL}$ as loads of power converter 20 may be unpredictable, which may increase complexity and power consumption of power delivery network 10. Such approach may also be sensitive to errors, as current $I_{PMAX}$ may be sensitive to errors in measuring equivalent series resistance $R_0$ and trace resistance $R_{TRACE}$. Such impedances may be small (e.g., as low as tens of milliohms), and thus measurement of such impedances may also introduce errors. Further, such approach may require real-time tracking of equivalent series resistance 36 for accurate estimation of battery current $I_{CELL}$, which itself may be very complex.

Figure 15:
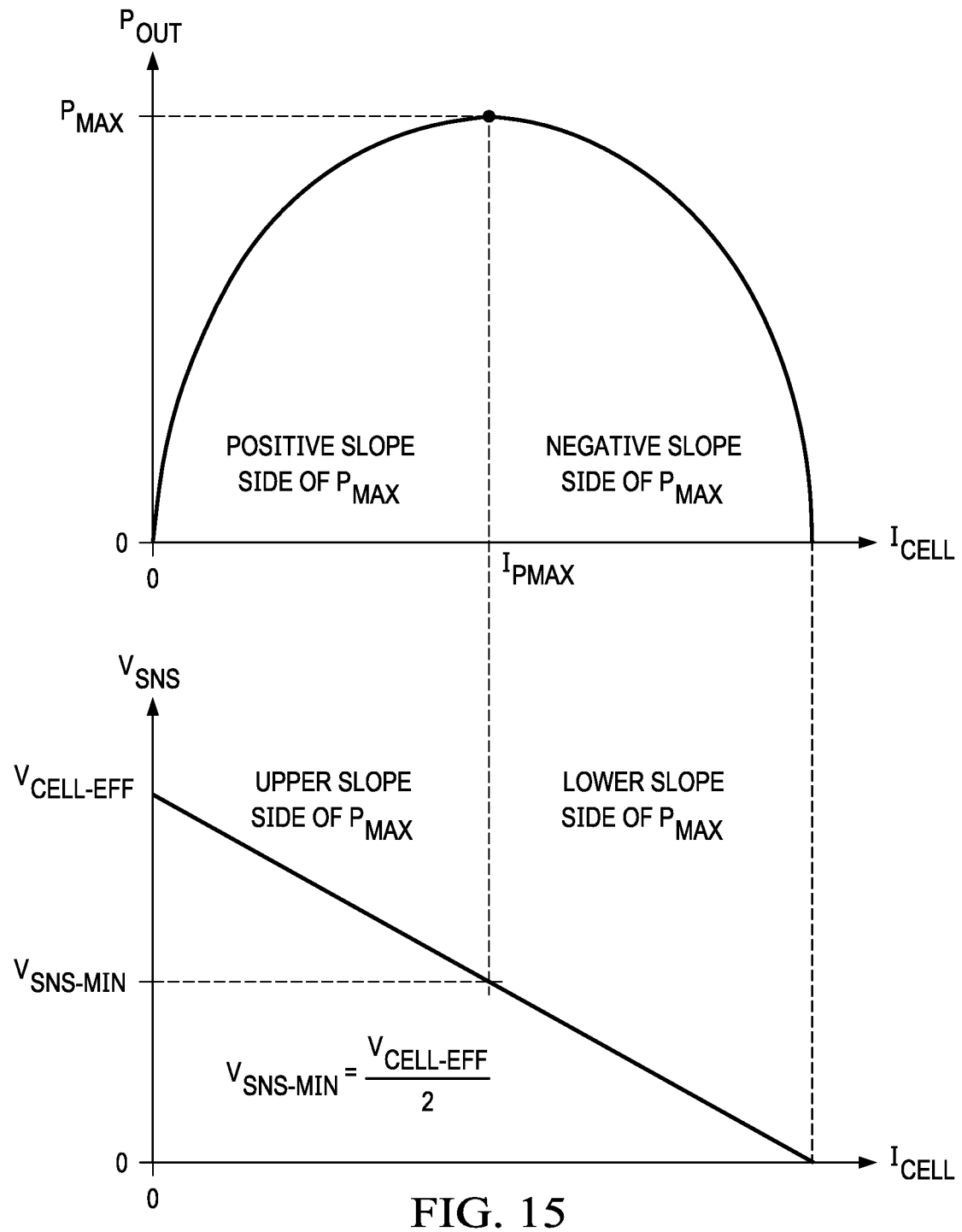
FIG. 15 illustrates an example graph of an output power of a power converter versus battery current drawn by the power converter mapped to an example graph of a sense voltage versus the battery current, in accordance with embodiments of the present disclosure.
Figure 16:
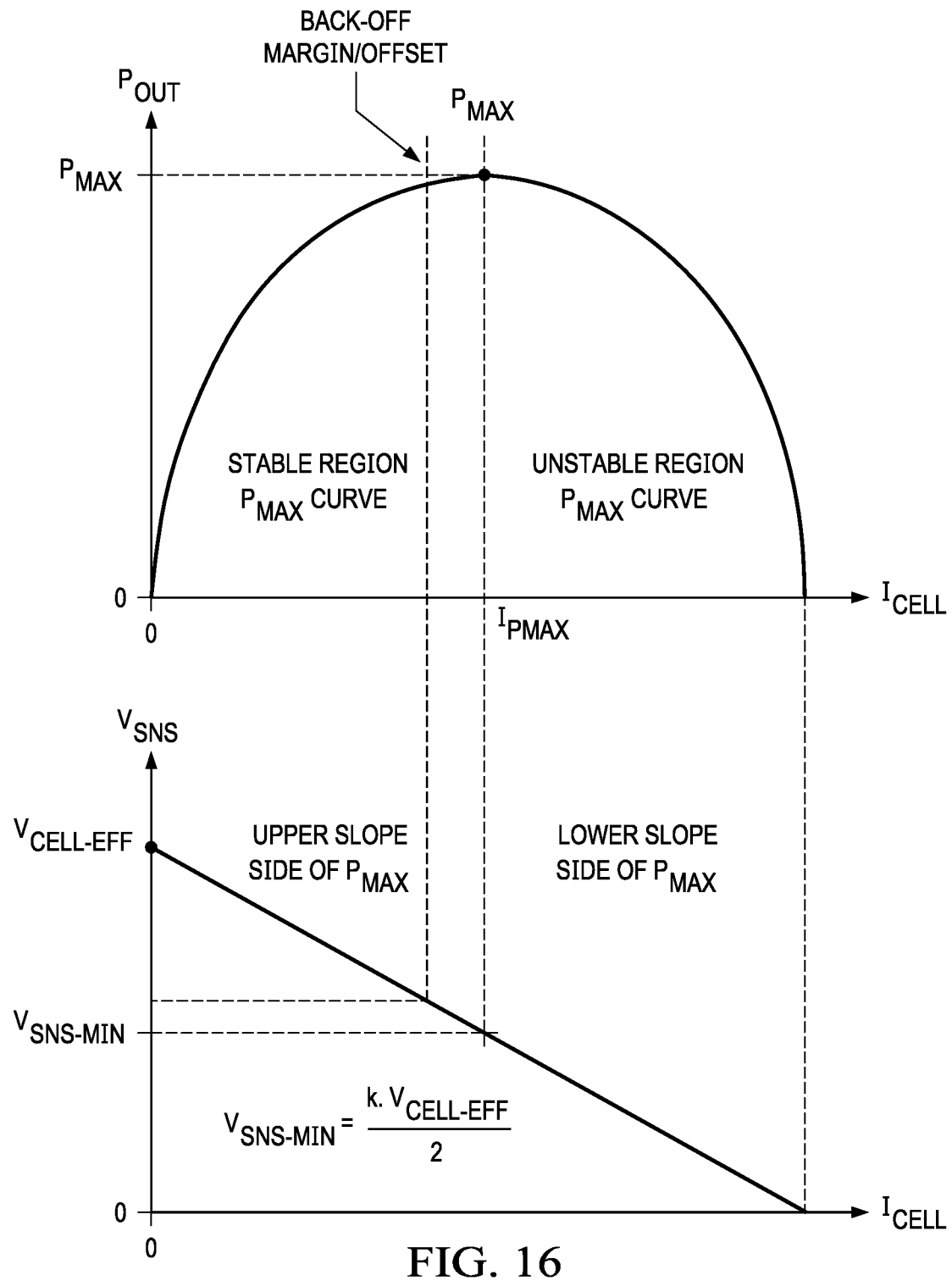
FIG. 16 illustrates another example graph of an output power of a power converter versus battery current drawn by the power converter mapped to an example graph of a sense voltage versus the battery current, in accordance with embodiments of the present disclosure.

A solution to this approach may be to track maximum power $P_{MAX}$ as function of voltage instead of current. Accordingly, control circuitry 30 may map the curve of output power $P_{OUT}$ versus battery current $I_{CELL}$ onto a curve of a sense voltage $V_{SNS}$ versus battery current $I_{CELL}$ as shown in FIG. 15, where sense voltage $V_{SNS}$ is a voltage sensed at an input to power converter 20. Provided that $V_{SNS} > V_{CELL-EFF}/2$, then $I_{CELL} < I_{PMAX}$. Accordingly, a single voltage, sense voltage $V_{SNS}$, may be used instead of current to track total power demanded by power converter 20 while at the same time maintaining stable operation. If $V_{SNS} < V_{CELL}\text{-}EFF/2$, it means that operation of power converter 20 may be on the unstable portion of the output power $P_{OUT}$ versus battery current $I_{CELL}$ curve, thus indicating to control circuitry 30 that it may need to take appropriate action to limit current drawn by power converter 20. Advantageously, the value $V_{CELL-EFF}/2$ is independent of any impedance terms that may be subject to measurement error. Accordingly, the approach of tracking maximum power $P_{MAX}$ as function of sense voltage $V_{SNS}$ instead of battery current $I_{CELL}$ may eliminate measurement dependence on resistive and impedance losses, may require less complexity and power consumption, and may reduce sensitivity errors in measurement and/or modeling.

Control circuitry 30 may use any suitable detection mechanism to determine if $V_{SNS} < V_{CELL-EFF}/2$, such as a voltage comparator. For example, a reference voltage $V_{SNS-MIN}$ applied to one input terminal of such comparator may be set to $kV_{CELL-EFF}$, where k is a constant multiplier equal to 0.5 or greater that may be chosen to meet the needs of a particular implementation. For example, in some embodiments, factor k may be a programmable parameter that may allow for adjusting reference voltage $V_{SNS-MIN}$ to provide a back-off, margin, or offset from maximum power $P_{MAX}$. Sense voltage $V_{SNS}$ may be applied to the other input terminal of such comparator. When the comparator indicates that $V_{SNS} < V_{SNS-MIN}$, its output logic state may toggle, indicating that power converter 20 is sourcing current beyond its maximum power point $P_{MAX}$. In response, control circuitry 30 may apply a current limit to power converter 20 so as to decrease a current sourced by power converter 20, thereby controlling power converter 20 away from operation in its unstable region. Accordingly, control circuitry 30 may use real-time feedback of sense voltage $V_{SNS}$ to dynamically adjust a current limit of power converter 20, and ensure that power converter 20 may achieve its maximum or near-maximum power delivery capability. Real-time feedback of sense voltage $V_{SNS}$ may require minimal hardware, firmware, and/or software components, thus enabling minimal latency and maximizing response speed of current limiting. Also advantageous is that using feedback of sense voltage $V_{SNS}$ to control current in a single power converter 20 may be load-agnostic to other loading on battery 12 by loads (e.g., other power converters) coupled to the electrical node of sense voltage $V_{SNS}$, as the term $V_{CELL-EFF}$ is independent of characteristics of such other loads on battery 12.

The approach of comparing sense voltage $V_{SNS}$ and voltage $V_{CELL-EFF}$ requires a measurement of voltage $V_{CELL-EFF}$. However, access to battery 12 from control circuitry 30 may be difficult from a practical standpoint, and thus instead of direct measurement, it may be necessary for control circuitry 30 to obtain an estimate of voltage $V_{CELL-EFF}$. Control circuitry 30 may estimate voltage $V_{CELL-EFF}$ in real-time by measuring voltages at two points in the transmission network between battery 12 and power converter 20. For example, control circuitry 30 may measure voltages at two or more points in the transmission network by using one or more analog-to-digital converters (ADCs) to concurrently or near-concurrently measure such voltages. For example, at a minimum, such two points may include the electrical node of battery voltage $V_{CELL}$ and sense voltage $V_{SNS}$. Given that voltage $V_{CELL-ADC}$ is a voltage measured by an ADC at the output of battery 12 and voltage $V_{SNS-ADC}$ is a voltage measure by an ADC at the input of power converter 20, an estimated voltage $\widetilde{V_{CELL-EFF}}$ for estimated voltage $V_{CELL}$ may be given by:

$$\widetilde{V_{CELL-EFF}} = V_{CELL-ADC} + \frac{R_0}{R_{TRACE} + R_{SNS}}(V_{CELL-ADC} - V_{SNS-ADC})$$

where the quantity $$\frac{R_0}{R_{TRACE} + R_{SNS}}$$

may be referred to as the "$P_{MAX}$ ratio." The $P_{MAX}$ ratio may represent the impedances on either side of the electrical node of battery voltage $V_{CELL}$. Thus, in instances in which a sense point has significant impedance (in the form of electrical conduit) "upstream" (e.g., closer to the terminal of battery 12) of the sense point, then such impedance should be added to equivalent series resistance $R_0$ in the numerator of the $P_{MAX}$ ratio.

In some embodiments, the value of the $P_{MAX}$ ratio may be stored in computer-readable media internal to or otherwise accessible to control circuitry 30. The $P_{MAX}$ ratio may be fixed for a given system, or may be dynamically updated during operation if impedances are known or otherwise determinable.

In these and other embodiments, control circuitry 30 may filter the computed value for estimated voltage $\widetilde{V_{CELL-EFF}}$ for example, by use of a low-pass filter. Such filtering may alleviate thermal noise, improve signal-to-noise ratio, and/or prevent toggling of comparators due to fast transients of sense voltage $V_{SNS}$.

In these and other embodiments, offsets or compensation factors may be added to one or more of estimated voltage $\widetilde{V_{CELL-EFF}}$ sense voltage $V_{SNS}$, and/or any other parameter to account for errors or inaccuracies in voltage measurement in voltage estimation, including path offsets, comparator offset, errors in programming $P_{MAX}$ ratio, errors in programming factor k, and/or any other error. For example, in some embodiments, an offset β may be added to reference voltage $V_{SNS-MIN}$ such that $$V_{SNS-MIN} = k\widetilde{V_{CELL-EFF}} + \beta$$

in order to, along with factor k, compensate for errors, offsets, and/or programming inaccuracies in accordance with system requirements. Adjustment of factor k and offset β may enable a very controlled excursion of a current limit into the unstable region of the power curve to extract as much power from battery 12 as possible. In some instances, control circuitry 30 may apply a recursive algorithm or machine learning to learn impedance parameters of power delivery network 10 in order to modify such parameters in real-time and on-the-fly. Such dynamic updating of parameters may optimize in-the-field performance of power delivery network 10 and obviate a need for firmware or software updates to improve performance of power converter 20 as a result of battery aging and life.

In addition to limiting current to provide for protection of battery 12 as described above, and in addition to limiting current to provide stability for power converter 20 as described above, it may also or alternatively be desirable to limit current based on considerations of practical implementations, as described in greater detail below.

As an example, beyond a certain voltage $V_{CELL-EFF}$, the maximum battery current $I_{CELL}$, and therefore the maximum power delivery capability $P_{MAX}$, of power converter 20 may become so large that the design of power converter 20 becomes increasingly difficult or even unfeasible. Practical limitations such as, for example, inductor saturation current and required dynamic range of current sensing circuitry in power converter 20 may dictate an upper power limit $P_{LIM}$ be placed on output power $P_{OUT}$. Thermal considerations may also need to be taken into consideration and may drive a need to limit maximum power delivery from power converter 20.

Assuming output power $P_{OUT}$ is limited to power limit $P_{LIM}$, a power balance equation for power delivery system 10 may be written as:

$$I_{CELL}^2 R_{TOT} - I_{CELL} V_{CELL-EFF} + P_{LIM} = 0$$

which can be rewritten as:

$$I_{CELL-LIM} = I_{PMAX} - \sqrt{\frac{P_{MAX} - P_{LIM}}{R_{TOT}}}$$

Figure 17:
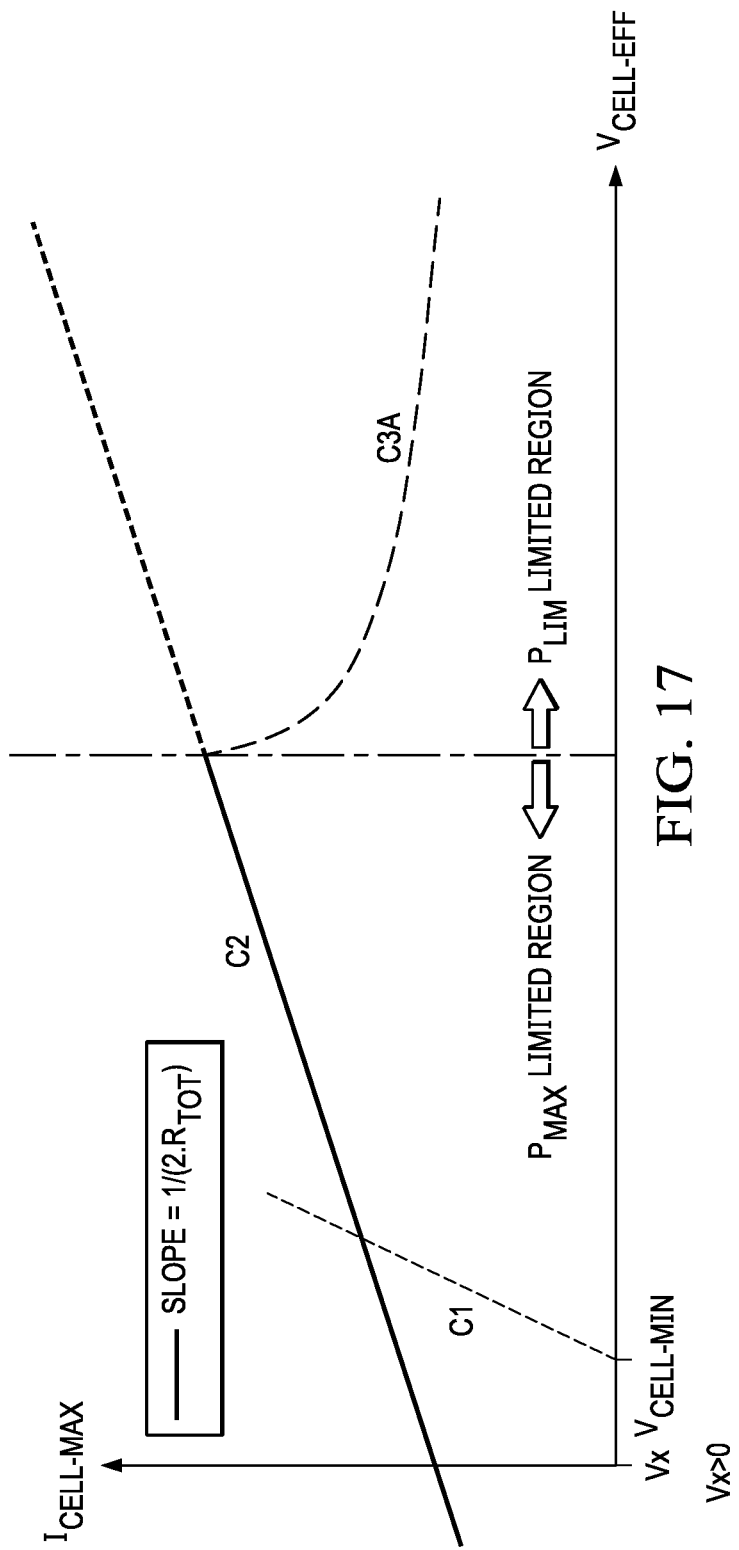
FIG. 17 illustrates an example graph of a maximum battery current versus an internal effective battery voltage for power limit considerations, in accordance with embodiments of the present disclosure.

This maximum allowable current $I_{CELL-LIM}$ may be plotted as shown in FIG. 17 as constraint CON3A superimposed over constraints CON1 and CON2 depicted in FIG. 14. A separation between two power limited regions for $P_{MAX}$ and $P_{LIM}$ are graphically shown in FIG. 17 as occurring at a breakpoint between the curves representing constraints CON2 and CON3A. In the region limited by power limit $P_{LIM}$, a maximum for battery current $I_{CELL}$ may be set by the lower of the two values for maximum allowable current. As is shown in FIG. 17, along the curve for constraint CON3A, the maximum current for battery current $I_{CELL}$ may increase as voltage $V_{CELL-EFF}$ decreases.

Figure 18:
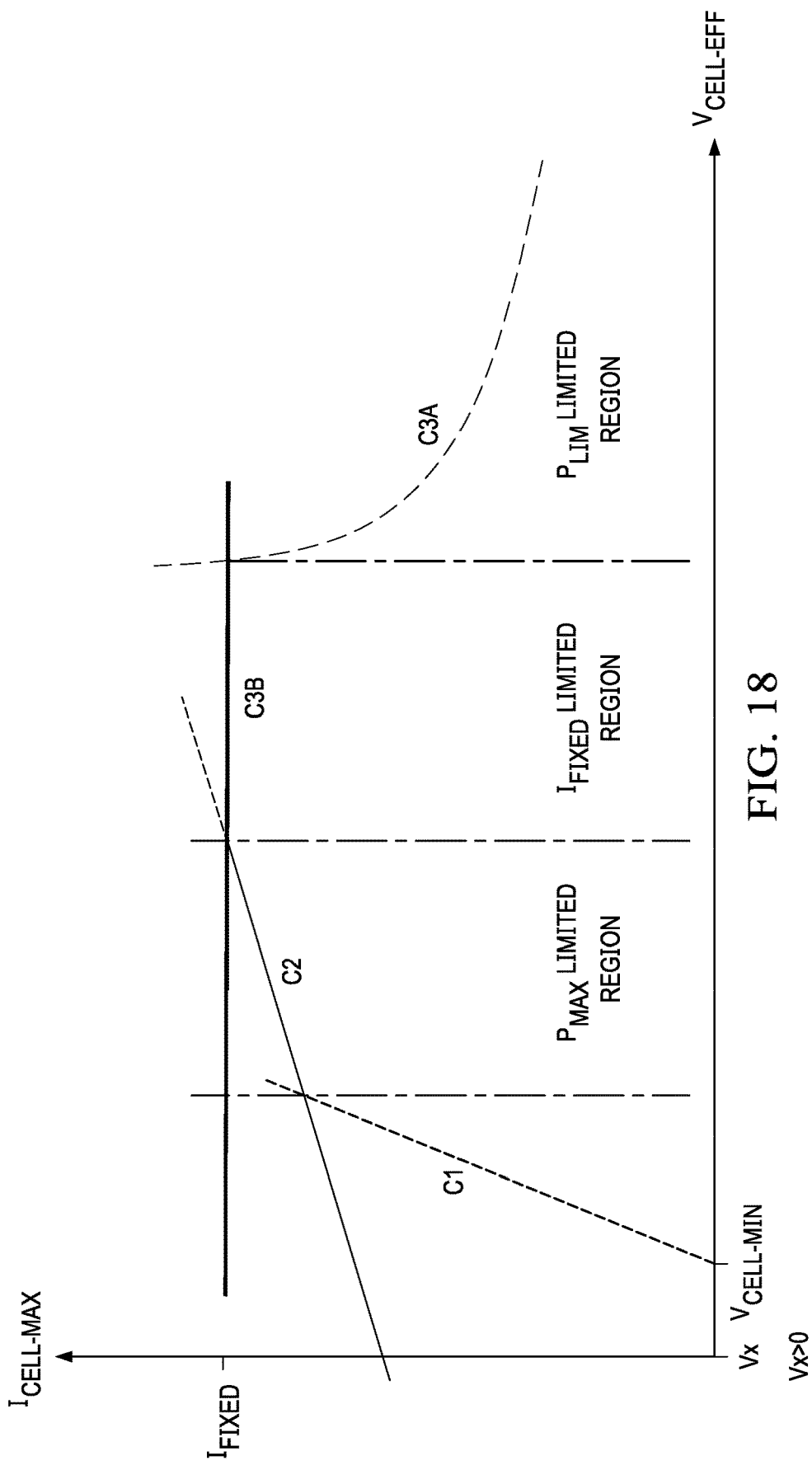
FIG. 18 illustrates an example graph of a maximum battery current versus an internal effective battery voltage for current limit considerations, in accordance with embodiments of the present disclosure.

In addition to limiting current to provide for protection of battery 12 as described above, limiting current to provide stability for power converter 20 as described above, and limiting current for power limiting considerations, it may also or alternatively be desirable to apply a fixed current limit $I_{FIXED}$ based on considerations of practical implementations, as described in greater detail below. This maximum allowable current $I_{FIXED}$ may be plotted as shown in FIG. 18 as constraint CON3B superimposed over constraints CON1, CON2, and CON3A depicted in FIG. 17. Thus the maximum current for battery current $I_{CELL}$ may be set by the lowest of the four values for maximum allowable current.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A power delivery system, comprising:
   a power converter configured to electrically couple to a power source and further configured to supply electrical energy to one or more loads electrically coupled to an output of the power converter; and
   control circuitry configured to:
      monitor a first voltage derived from the power source, wherein the first voltage is indicative of a total power demanded by the power converter; and
      control a limit for a current supplied from the power source to the one or more loads based on comparison of the first voltage to a threshold voltage, wherein the threshold voltage is indicative of a point within a range of operation of the power converter at which the power converter delivers a maximum amount of power to the one or more loads.

2. The power delivery system of claim 1, wherein the control circuitry is further configured to control the power converter to regulate the first voltage to remain greater in magnitude than the threshold voltage.

3. The power delivery system of claim 1, wherein the threshold voltage is a function of an open circuit voltage of the power source for a given state of charge of the power source.

4. The power delivery system of claim 3, wherein the control circuitry is configured to estimate the open circuit voltage of the power source for the given state of charge of the power source based on two voltages measured within the power delivery network.

5. The power delivery system of claim 1, wherein the first voltage is indicative of a total power demanded by the power converter and is independent of any impedance components of the power delivery system.

6. The power delivery system of claim 1, wherein the power source is a battery.

7. The power delivery system of claim 6, wherein the battery is rechargeable.

8. The power delivery system of claim 7, wherein the battery is a lithium-ion battery.

9. The power delivery system of claim 1, wherein the control circuitry is further configured to control the power converter to regulate the limit for the current supplied from the power source to the one or more loads based solely on a function of voltage.

10. A method, comprising:
    monitoring a voltage derived from a power source, wherein the first voltage is indicative of a total power demanded by a power converter configured to electrically couple to the power source and is further configured to supply electrical energy to one or more loads electrically coupled to an output of the power converter; and
    controlling a limit for a current supplied from the power source to the one or more loads based on comparison of the first voltage to a threshold voltage, wherein the threshold voltage is indicative of a point within a range of operation of the power converter at which the power converter delivers a maximum amount of power to the one or more loads.

11. The method of claim 10, further comprising controlling the power converter to regulate the first voltage to remain greater in magnitude than the threshold voltage.

12. The method of claim 10, wherein the threshold voltage is a function of an open circuit voltage of the power source for a given state of charge of the power source.

13. The method of claim 12, further comprising estimating the open circuit voltage of the power source for the given state of charge of the power source based on two voltages measured within the power delivery network.

14. The method of claim 10, wherein the first voltage is indicative of a total power demanded by the power converter and is independent of any impedance components of the power delivery system.

15. The method of claim 10, wherein the power source is a battery.

16. The method of claim 15, wherein the battery is rechargeable.

17. The method of claim 16, wherein the battery is a lithium-ion battery.

18. The method of claim 10, further comprising controlling the power converter to regulate the limit for the current supplied from the power source to the one or more loads based solely on a function of voltage.

* * * * *